(12) United States Patent
Goel et al.

(10) Patent No.: US 10,917,499 B2
(45) Date of Patent: *Feb. 9, 2021

(54) PERSONALIZED ENTITY INFORMATION PAGE

(71) Applicant: GOOGLE LLC, Mountain View, CA (US)

(72) Inventors: Ankita Goel, Mountain View, CA (US); Jeromy William Henry, Aptos, CA (US); Emily Moxley, Mountain View, CA (US); Jeremy Silber, New York, NY (US); Kai Conragan, Moss Beach, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,270

(22) Filed: Mar. 9, 2020

(65) Prior Publication Data

US 2020/0220947 A1 Jul. 9, 2020

Related U.S. Application Data

(63) Continuation of application No. 16/159,326, filed on Oct. 12, 2018, now Pat. No. 10,587,726, which is a
(Continued)

(51) Int. Cl.
*H04L 29/08* (2006.01)
*G06F 16/248* (2019.01)
(Continued)

(52) U.S. Cl.
CPC .......... *H04L 67/327* (2013.01); *G06F 16/248* (2019.01); *G06F 16/958* (2019.01); *H04L 67/22* (2013.01); *H04L 67/42* (2013.01)

(58) Field of Classification Search
CPC .......... G06F 17/30554; G06F 17/3089; H04L 67/327; H04L 67/22; H04L 67/42
(Continued)

(56) References Cited

U.S. PATENT DOCUMENTS 6,744,452 B1   6/2004 McBrearty et al.
7,581,173 B1   8/2009 Ferguson et al.
(Continued)

OTHER PUBLICATIONS

Google Inc., International Search Report and Written Opinion, PCT/US2015/061152, dated Feb. 18, 2016, 12 pgs.
(Continued)

*Primary Examiner* — Tauqir Hussain
(74) *Attorney, Agent, or Firm* — Brake Hughes Bellermann LLP

(57) ABSTRACT

The various implementations described herein include methods and systems for displaying information about entities in a structured way. In one aspect, a method is performed at a server system comprising memory and processors. The server receives a request from a client device for an information page associated with an entity. The server identifies automatically information and information types associated with the entity. The server generates and formats automatically a structured information page having regions for the entity, including determining a primary color associated with the entity, and configuring respective regions of the structured information page with corresponding accent colors based on the primary color. The server populates the regions of the structured information page with information of the entity for the identified information types, and transmits the generated and formatted page to the client device for display.

20 Claims, 11 Drawing Sheets

Related U.S. Application Data continuation of application No. 14/942,916, filed on Nov. 16, 2015, now Pat. No. 10,110,701.

(60) Provisional application No. 62/081,001, filed on Nov. 17, 2014.

(51) Int. Cl.
*G06F 16/958* (2019.01)
*H04L 29/06* (2006.01)

(58) Field of Classification Search
USPC .......................................................... 709/203
See application file for complete search history.

(56) References Cited

U.S. PATENT DOCUMENTS

| | | | |
|---|---|---|---|
| 7,702,811 B2 | 4/2010 | Gopalan et al. | |
| 7,747,472 B2 | 6/2010 | Barnhart | |
| 8,090,822 B2* | 1/2012 | Lee | H04N 21/44222 709/224 |
| 8,165,915 B1 | 4/2012 | Lucash | |
| 8,639,680 B1 | 1/2014 | Ciccolo et al. | |
| 8,731,283 B2 | 5/2014 | Homma et al. | |
| 8,731,289 B2* | 5/2014 | Straub | H04N 1/644 382/167 |
| 9,311,427 B2* | 4/2016 | Kwan | G06F 8/36 |
| 9,378,294 B2* | 6/2016 | Chung | G06F 16/9577 |
| 9,633,128 B2* | 4/2017 | Blinn | G06F 40/154 |
| 9,639,624 B2 | 5/2017 | Ishikawa et al. | |
| 9,646,096 B2* | 5/2017 | Tsai | H04L 67/22 |
| 9,659,103 B2* | 5/2017 | Tsai | G06F 16/958 |
| 10,073,922 B2 | 9/2018 | Borshack | |
| 2012/0089933 A1 | 4/2012 | Garand et al. | |
| 2012/0117058 A1* | 5/2012 | Rubinstein | G06Q 30/0601 707/723 |
| 2012/0117258 A1* | 5/2012 | Spivey | G06F 16/958 709/229 |
| 2016/0173644 A1* | 6/2016 | Goel | H04L 67/22 709/203 |

OTHER PUBLICATIONS

Guo et al., Names entity recognition in query, Proc. 32nd Int'l ACM SIGIR Conference on Research and Development in Information Retrieval, SIGIR '09, Jan. 1, 2009, p. 267.

Kedrosky, Curation is the New Search is the New Curation, http://paul.kedrosky.com, Aug. 19, 2014, 2 pgs.

Nadeau, A survey of named entity recogntion and classification, Jan. 1, 2007, pp. 1-20, http://nlp.cs.nyu.edu/sekine/papers/li07.pdf.

\* cited by examiner ated Oct. 23, 2018, which claims the benefit of U.S. Provisional Application No. 62/081,001, titled "Structured Entity Information Page," filed Nov. 17, 2014, each of which is hereby incorporated by reference herein in its entirety.

PERSONALIZED ENTITY INFORMATION PAGE

RELATED APPLICATIONS

This application is a continuation of U.S. patent application Ser. No. 16/159,326, filed Oct. 12, 2018, titled "Structured Entity Information Page," which is a continuation of U.S. application Ser. No. 14/942,916, filed Nov. 16, 2015, titled "Structured Entity Information Page," now U.S. Pat. No. 10,110,701, issued Oct. 23, 2018, which claims the benefit of U.S. Provisional Application No. 62/081,001, titled "Structured Entity Information Page," filed Nov. 17, 2014, each of which is hereby incorporated by reference herein in its entirety.

TECHNICAL FIELD

The present application describes systems and methods for displaying information about entities in a structured way.

BACKGROUND

To better serve users, web pages and other sources of visually-presented information aim to provide information in a way that is clear, useful, and engaging. One way to do that is to provide information in a format in which information about a subject of user interest is curated and presented structurally. Curation of the information, so that the information presented is the most important and/or useful, requires human input, but manual curation by human editors does not scale well. On the other hand, structuring information according to a predefined scheme scales well, but risks burdening the information page with information that users may find not important and/or not useful.

BRIEF DESCRIPTION OF THE DRAWINGS

Like reference numerals refer to corresponding parts throughout the drawings.

DESCRIPTION OF IMPLEMENTATIONS

The methods and systems described herein disclose systems and methods for presenting information of various information types about an entity in a structured information page, in which some of the information types included in the structured information page are dynamically selected for inclusion in the structured information page in accordance with historical user activity. Such methods and systems provide an effective way to present to users entity information that is organized and which includes information that users are more likely to consider important.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
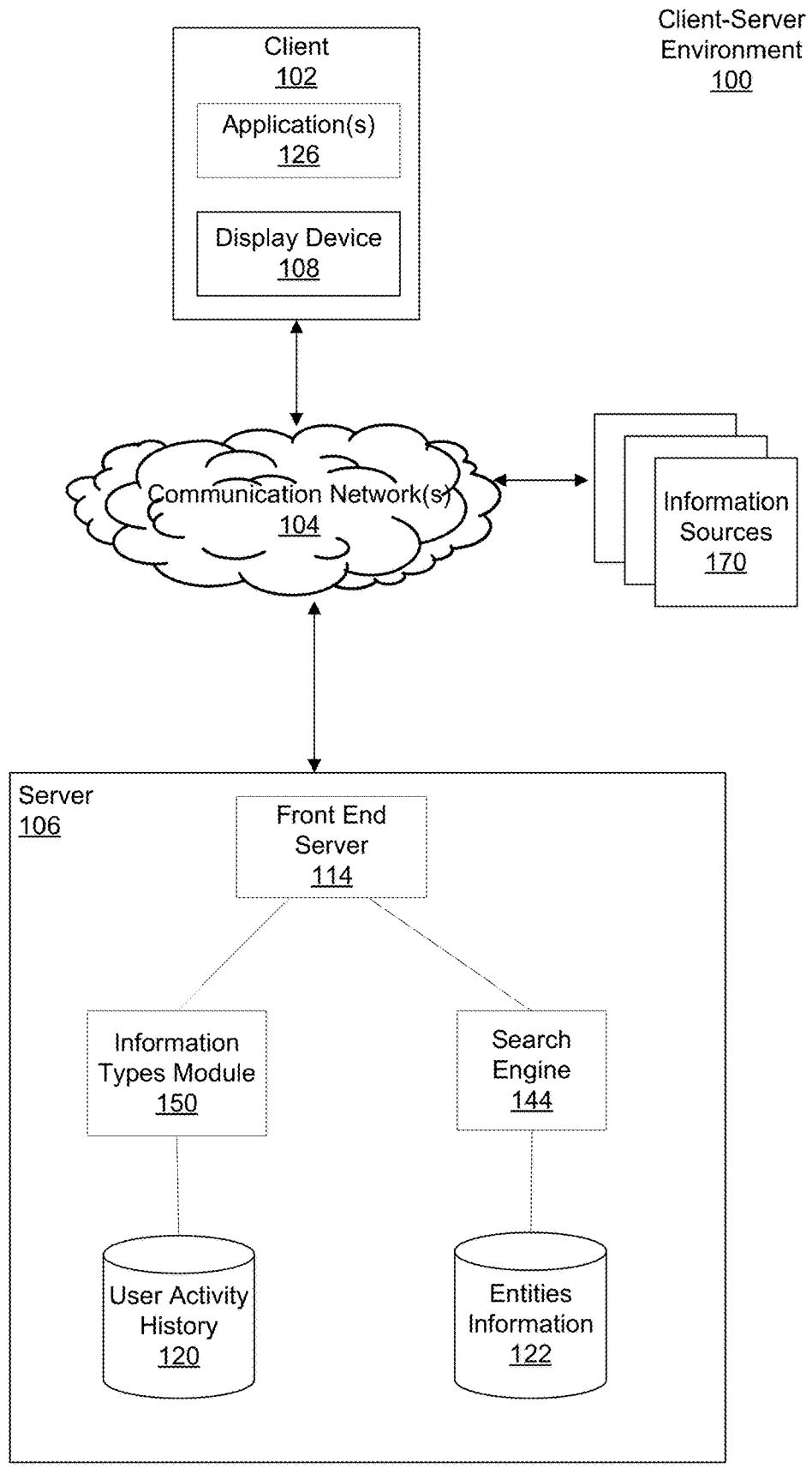
FIG. 1 is a block diagram illustrating a distributed client-server system in accordance with some implementations.

FIG. 1 is a block diagram illustrating a client-server environment 100 that includes: a client system or device 102, one or more communication networks 104, a server system 106, and optionally one or more information sources 170. The server system 106 is coupled to the client device 102 and information sources 170 by the communication network(s) 104. In some implementations, the server system 106 is a search engine system.

In some implementations, the server system 106 is implemented as a single server system, while in other implementations the server system 106 is implemented as a distributed system of multiple servers. Solely for convenience of explanation, the server system 106 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the client device 102, the server system 106, and the information sources 170. In some implementations, the communication network 104 uses the HyperText Transport Protocol (HTTP) to transport information using the Transmission Control Protocol/Internet Protocol (TCP/IP). HTTP permits client devices 102 to access various resources available via the communication network(s) 104. The various implementations described herein, however, are not limited to the use of any particular protocol.

The distributed system 100 includes one or more information sources 170, which include any type of external sources of information about entities, such as websites, databases, online stores, online media content sources, and so on.

Figure 3:
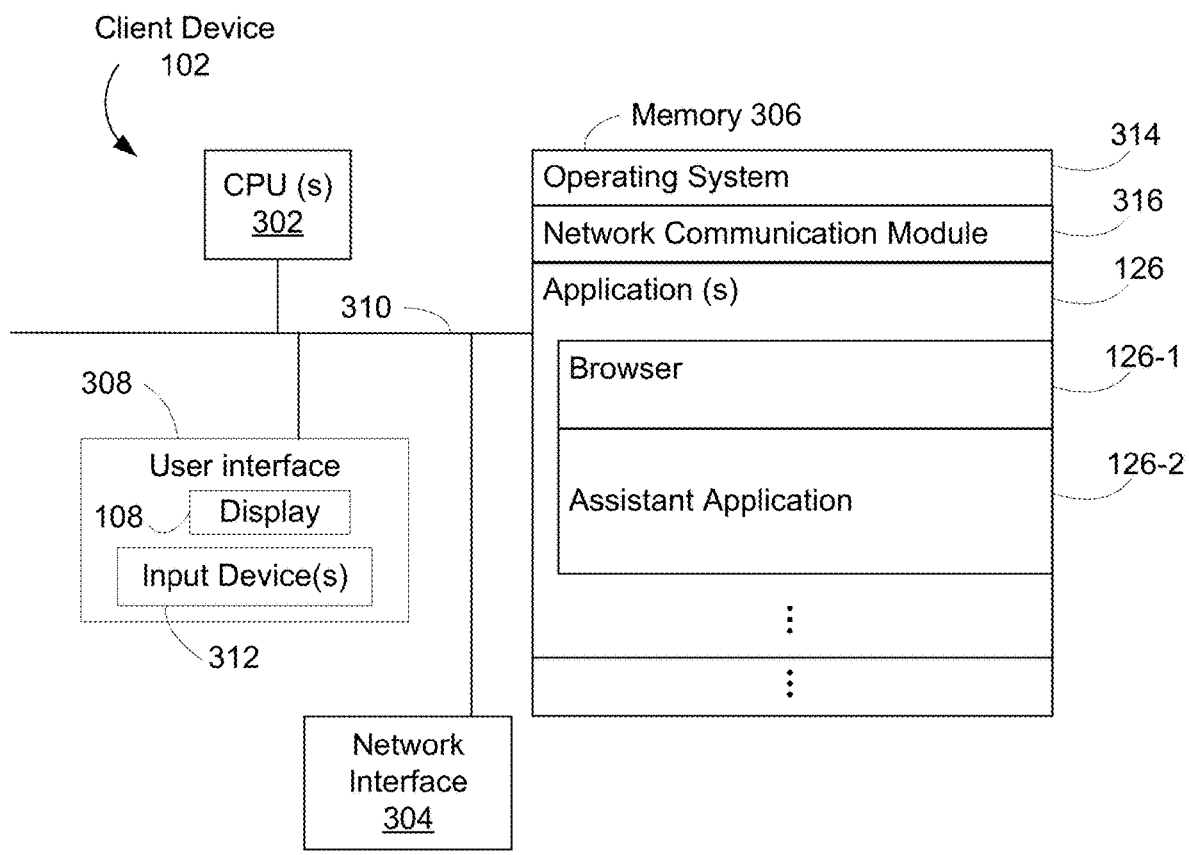
FIG. 3 is a block diagram illustrating the structure of an example client device in accordance with some implementations.

The client device 102 may be any suitable computer device that is capable of connecting to the communication network 104(s), such as a desktop computer, a laptop computer, a tablet device, a netbook, a mobile phone, a smartphone, a tablet device, a gaming device, a multimedia player device, a personal digital assistant, a set-top box, or any other device that is capable of communicating with the server system 106. The client device 102 typically includes one or more processors, non-volatile memory such as a hard disk drive, and a display. The client device 102 may also include input devices such as a keyboard and/or a mouse (as shown in FIG. 3). In some implementations, the client device 140 includes one or more touch-sensitive surfaces, such as a touch screen display and/or a touchpad.

In some implementations, the client device 102 is externally connected to a display device 108 (e.g., the client device 102 and display device 108 are distinct, connected devices). In some other implementations, the display device 108 is integrated with the client device 102 (e.g., the display device 108 is a component of the client device 102). The display device 108 can be any display for presenting content to a user. In some implementations, the display device 108 is the display of a television, or a computer monitor, or an integrated display (e.g., the display of a laptop computer or a smartphone) that is configured to receive and display visual content signals from the client 102. In some implementations, the display device 108 is a LCD screen, a tablet device display, a mobile phone display, a smartphone display, a projector, or any other type of video or graphical display system or device.

In some implementations, the client device 102 includes one or more applications 126. The one or more applications 126 may send information and other communications to the server system 106, and receive and present information received from the server 106. In some implementations, the applications 126 include a web browser and/or an assistant application. In some implementations, an assistant application obtains and presents information relevant to the user based on a variety of signals, including, but not limited to, the user's demographic information, the current location of the device and/or the user, the user's calendar, the user's contact list, the user's social network(s), the user's search history, the user's web browsing history, the device's and/or the user's location history, the user's stated preferences, the user's content viewing history, and the content being currently presented to the user.

In some implementations, the server system 106 includes a front end server 114 that facilitates communication between the server system 106 and the communication network(s) 104. The front end server 114 receives communications (e.g., a search query, a request for information) from the client 102. In some implementations, the front end server 114 is configured to generate a response (e.g., a web page, an information "card" or page) to the communications from the client 102, and send the response to the client device 102. In some implementations, the front end server 114 is configured to send content links to content (e.g., including the content links in a generated response).

The server 106 includes an entities information repository 122 of information about or associated with entities (e.g., a database). As used herein, an entity is any distinct existence or thing, and an entity class is a class or category of entities. In some implementations, entity classes include, without limitation, movies, television shows, books, music albums, video games, places of business (e.g., restaurants), and organizations. The information stored in the repository 122 includes locally stored information (e.g., for a movie, the cast and crew lists stored within the repository 122 and directly retrievable from the repository 122) and/or an index of information about/associated with entities in information sources 170 (e.g., links to documents in information sources 170). Further details about entities information are described below.

The server 106 includes a search engine module 144. The search engine module 144 receives search queries sent from the client 102 and passed to the search engine module 144 by the front end server 114. The search engine module 144 processes the query (e.g., determining if an entity in the entities information 122 satisfies the search query), and retrieves information from the entities information 122 responsive to the search query. The search engine 144 passes the responsive information to the front end server 114, where a presentation of the responsive information (e.g., a structured information page, a "card") is generated and sent to the client 102 for display.

Entities information that may be stored in or indexed from the entities information repository 122 includes any information, about or associated with an entity, in any number of information types. An information type is a type of information that corresponds to an aspect or attribute of or about an entity. For example, for a movie, information types for a movie include, without limitation, the title, running time, cast, crew, content rating, review information (e.g., review scores, review snippets), theater show times for the movie, purchase, rental, or online viewing locations, information on songs and/or music included in the movie, awards nominated and won, box office receipts information, plot synopsis or summary, trivia, images (e.g., cast photos, advertising images, posters) associated with the entity, and so on. It should be appreciated that the list of movie information types above is merely exemplary, and may include more or less types than listed, as well as more coarse-grained or fine-grained types than listed. For example, the information types for a movie may include more fine-grained types associated with the movie's crew, such as director, cinematographer, producer, screenplay writer, composer, and so on.

In some implementations, an entity class is associated with a set of candidate information types. Entity information for any instance of the entity class includes information corresponding to information types drawn from the set of candidate information types for the entity class. Thus, for example, the set of candidate information types for movies is different from the set of candidate information types for television shows (e.g., episodes would be an information type for television shows but not movies; box office receipts information would be an information type for movies but not television shows). In some implementations the set of candidate information types for an entity class is predefined. In some implementations, information types may be added to or removed from a predefined set of candidate information types (e.g., by human editors or administrators).

In some implementations, the set of candidate information types for an entity class includes a subset of information types that is a default or "standard" set of information types for the entity class. A structured information page for an entity includes information in the default subset of information types; a structured information page for an entity of an entity class is predefined to include information in the default subset of information types for the entity class. For example, structured information pages for movies, across the board, include the title, running time, and the cast. In some implementations, just as the set of candidate information types differ by entity class, the default subset of information types also differ by entity class.

The structured information page for an entity includes information corresponding to information types in addition to those in the default subset. In some implementations, these additional information types are selected by the server system 106. In some implementations, the server system 106 selects the additional information types based on historical user activity history. The server system 106 includes an information types module 150 that analyzes the historical user activity, stored in the user activity history 120, to determine which information types, other than those in the default set, satisfy one or more importance criteria. These importance criteria gauge the importance of an information type for an entity from the perspective of users.

In some implementations, the user activity history 120 includes the search query histories of users (e.g., user search logs), which list the queries that users have made. By analyzing the query histories of users, the information types module 150 can determine which information types users want information for with respect to an entity, and thus are important to users. For query histories, the importance criteria include, for example, search popularity all-time, search popularity over a predefined time window or over a rolling time window, presence of search spikes, and so on. For example, if the information types module 150 identifies a high number of queries for movie songs in the user activity history 120, the information type module 150 may determine that the song(s) for a movie is an important information type. Thus, the information types module 150 determines which information types are important (e.g., ranks the information types in accordance with the importance criteria), and selects one or more (in some implementations, up to a predefined number, e.g., five) of the "most important" of the information types (e.g., those ranked highest in accordance with the importance criteria) for inclusion in structured information pages along with the default set of information types. This selection is dynamic in that the selection is based on user activity history, which is constantly growing and changing as users perform activities (e.g., make search queries).

In some implementations, the information types module 150 dynamically selects information types by entity class. In some implementations, the information types module 150 further dynamically selects information types per entity. For example, the movie song information type may not be ranked high enough to be selected for inclusion in structured information pages for movies across the board. However, if the information types module 150 identifies a relatively high number of queries for the song for a particular movie, the song information type may be selected for inclusion in the structured information page for that particular movie.

In some implementations, information, associated with an entity, corresponding to an information type that is in the default set or is dynamically selected is omitted from the structured information page and the information card if that information is not available. For example, the structured information page and the information card for a movie that is not in theaters (or more specifically, theaters proximate to the location of the client device 102) omits theaters showing the movie and corresponding show times, whereas the structured information page and the information card for a movie that is in theaters may include theaters showing the movie and corresponding show times.

A user of the client device 102 may, from within an application 126, input a search query. The client device 102 sends the search query to the server system 106. The search engine 144 processes the query. If the search engine 144 determines that the search query is a query for information associated with an entity, the search engine 144 retrieves entity information responsive to the query from the entities information 122.

In some implementations, the server system 106, in response to the query, generates an information "card" for the entity, and sends that card to the client 102. At the client 102, an application 126 displays the information card. In some implementations, the information "card" includes at least some of the information associated with the entity that corresponds to the default set of information types, and optionally information associated with the entity corresponding to one or more dynamically selected information types. The information "card" also includes an affordance. In some implementations, in response to a user activation of the affordance (e.g., by clicking or performing a gesture on the affordance), the application 126 sends a request to the server system 106 for a structured information page associated with the entity. The server system 106 generates the structured information page and sends the page to the client 102. The application 126 displays the structured information page, which includes additional information corresponding to the default set of information types and additional information corresponding to dynamically selected information types; activating the affordance "expands" the information card to the structured information page.

In some other implementations, the structured information page is sent to the client 102 along with the information card in response to the query. In response to a user activation of the affordance, the application 126 displays the structured information page (without needing the separate request for the structured information page).

In some other implementations, in response to the query, the server system 106 generates the structured information page, omitting the information card, and sends the structured information page to the client 102. The application 126 displays the structured information page, omitting the information card.

In some implementations, the structured information page, as well as the information card, has respective regions in which respective information associated with the entity are displayed. Further details regarding the structured information page and the information card are described below.

In some implementations, the server system 106 determines a primary color and a secondary color associated with an entity. The primary color and secondary color may be used as background colors in the structured information page and the information card. The server system 106 (e.g., an entity colors module 250, FIG. 2) determines the colors based on an image (e.g., advertisements, cover art, trade dress) associated with the entity. In some implementations, the server system 106 determines a primary color based on the image associated with the entity and determines a secondary color based on the primary color (e.g., the secondary color as a different shade of the primary color). Further details regarding primary colors and secondary colors in the structured information page and the information card, including methods for determining the primary color and the secondary color, are described below.

Figure 2:
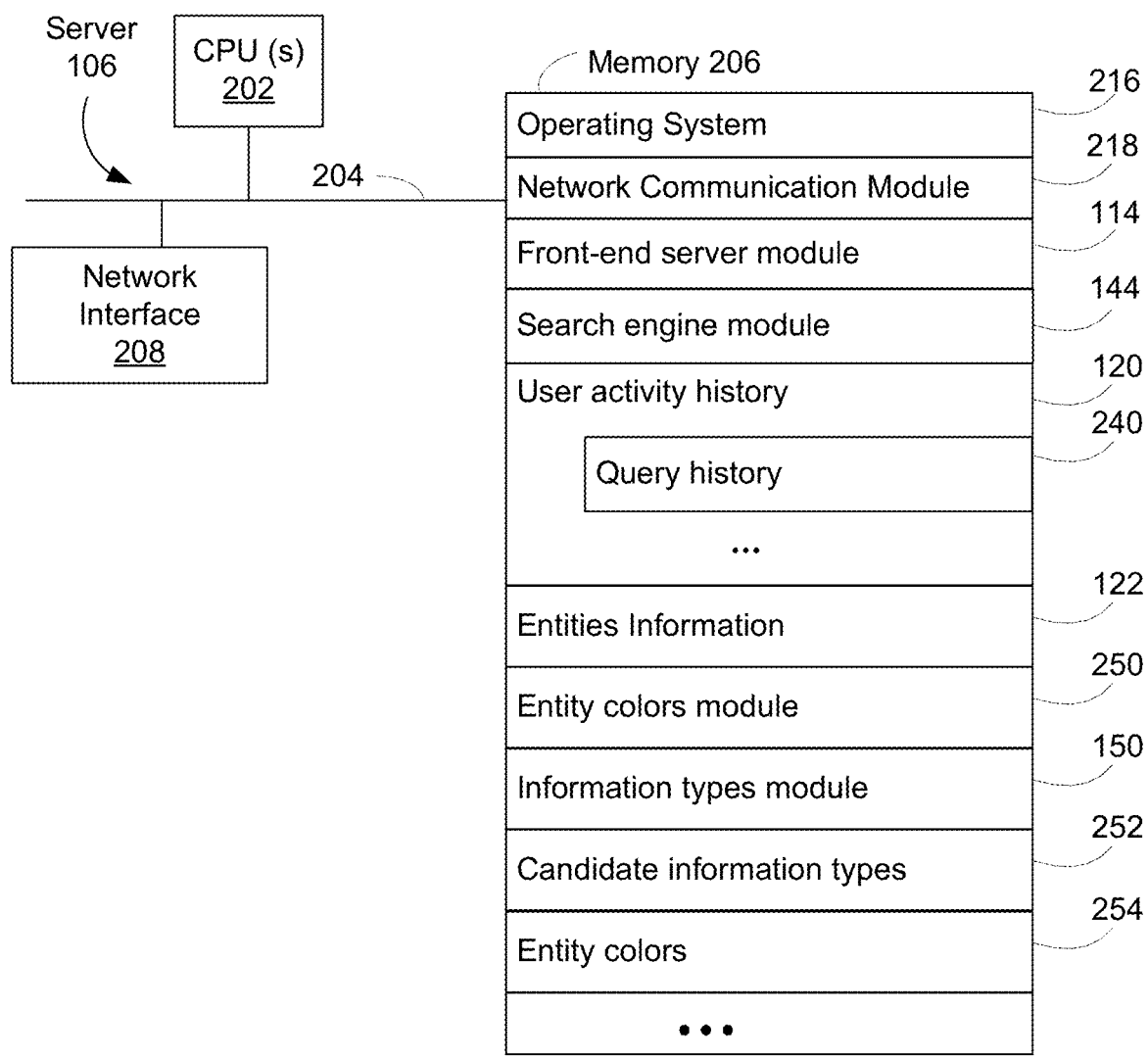
FIG. 2 is a block diagram illustrating the structure of an example server system according to some implementations.

FIG. 2 is a block diagram illustrating a server system 106, in accordance with some implementations. The server system 106 typically includes one or more processing units (CPU's) 202, one or more network or other communications interfaces 208, memory 206, and one or more communication buses 204 for interconnecting these components. The communication buses 204 optionally include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium. In some implementations, memory 206 or the non-transitory computer readable storage medium of memory 206 stores the following programs, modules and data structures, or a subset thereof, including an operation system 216, a network communication module 218, a front-end server module 114, a search engine module 144, user activity history 120, entities information 122, and an entity colors module 250.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The front-end server module 114 is configured to receive communications (e.g., search queries, requests) from clients 102, and generating and sending responses (e.g., information cards, structured information pages), including formatting information and pages and cards that serve as the responses, to the clients 102. The front-send server module 114 also passes queries received from clients 102 to the search engine module 144 and receives information responsive to the search queries from the search engine module 144.

The search engine module 144 is configured to process search queries, including retrieving information responsive to search queries from the entities information 122.

The user activity history 120 stores historical user activity, including a history of user search queries 240 (e.g., search query logs).

The entities information 122 stores information and/or links/pointers to information associated with entities.

The entity colors module 250 is configured to determine primary and secondary colors for entities.

The information types module 150 is configured to analyze the user activity history 120 and select information types from the candidate information types 252 that are determined to be important to users based on the analysis of the user activity history.

The candidate information types 252 stores sets of candidate information types by entity class and default sets of information types by entity class, as well as which information types are associated with a primary color and which information types are associated with a secondary color.

The entity colors 254 stores primary and secondary colors for respective entities, as determined by the entity colors module 250.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a server system, FIG. 2 is intended more as a functional description of the various features which may be present in a set of servers than as a structural schematic of the implementations described herein. In practice, and as recognized by those of ordinary skill in the art, items shown separately could be combined and some items could be separated. For example, some items (e.g., operating system 216 and network communication module 218) shown separately in FIG. 2 could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

FIG. 3 is a block diagram illustrating a client device 102 in accordance with some implementations. The client device 102 typically includes one or more processing units (CPU's) 302, one or more network or other communications interfaces 304, memory 306, and one or more communication buses 310, for interconnecting these components. The communication buses 310 optionally include circuitry (sometimes called a chipset) that interconnects and controls communications between system components. The client device 102 may also include a user interface comprising a display device 108 and one or more input devices (e.g., a keyboard, mouse or other pointing device, touchpad, touch screen, remote control, game controller) 312. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some implementations, memory 306 or the computer readable storage medium of memory 306 store the following programs, modules and data structures, or a subset thereof, including operation system 314, network communication module 316, and applications 126.

The operating system 314 includes procedures for handling various basic system services and for performing hardware dependent tasks.

The network communication module 316 facilitates communication with other devices via the one or more communication network interfaces 304 (wired or wireless) and one or more communication networks, such as the Internet, other wide area networks, local area networks, metropolitan area networks, and so on.

The client device 102 includes one or more applications 126. In some implementations, the applications 126 include a browser application 126-1 and an assistant application 126-2. The browser application 126-1 (e.g., a web browser) displays web pages (e.g., a search page with a search box for entering a search query, a page or card of information associated with an entity) and other pages and content. The assistant application (which may also be referred to as an "intelligent personal assistant" application) 126-2 displays information that is relevant to the user at the moment and performs tasks or services relevant to the user or requested by the user. In some implementations, the assistant application includes a search interface, in which the user may enter a search query. The applications 126 are not limited to the applications discussed above. For example, applications 126 may include a search application (not shown).

In some implementations, the client device 102 includes a location module (not shown) for determining the location of the client device 102, and optionally a location device (e.g., GPS device or component) (not shown). The location module determines the location of the client device 102 using one or more techniques (e.g., GPS positioning in conjunction with the location device, cell tower triangulation, Wi-Fi positioning). The location may be sent to the server system 106 as part of a search query or information request.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3 shows a client device, FIG. 3 is intended more as a functional description of the various features which may be present in a client device than as a structural schematic of the implementations described herein. In practice, and as recognized by those of ordinary skill in the art, items shown separately could be combined and some items could be separated.

Figure 4A:
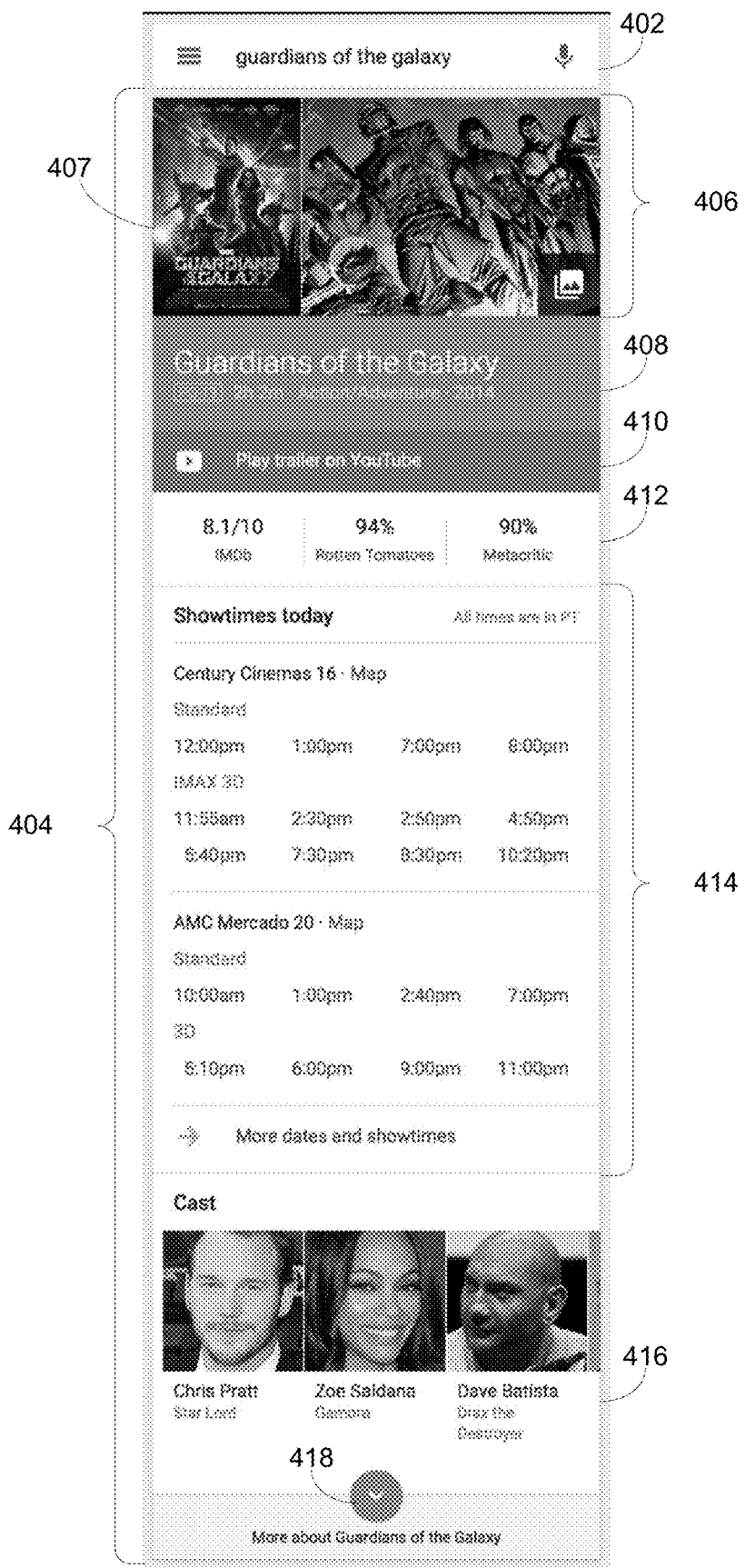
FIG. 4A illustrates an example information card in accordance with some implementations.

FIG. 4A illustrates an example information card in accordance with some implementations. FIG. 4A shows a search box 402 in an application (e.g., an assistant application, a browser, a search application), with a query for "guardians of the galaxy." The client 102 sends the query to the server system 106. The server system 106 determines that the query matches the movie entity "Guardians of the Galaxy," generates an information card 404 with information associated with "Guardians of the Galaxy," and sends the card 404 to the client 102. The card 404 is displayed at the client 102.

The card 404 includes multiple regions, each displaying some information associated with the movie "Guardians of the Galaxy." For example, the card 404 includes an image gallery region 406 that includes one or more images associated with "Guardians of the Galaxy." Title region 408 shows the movie title, "Guardians of the Galaxy," as well as other information such as the content rating, running time, genre, and release year. A region 410 includes a link to an online video of the trailer for "Guardians of the Galaxy."

As shown in FIG. 4A, the title region 408 has a primary color associated with "Guardians of the Galaxy" as determined by the server system 106 (e.g., by entity colors module 250) as its background color, and region 410 has a secondary color associated with "Guardians of the Galaxy" as determined by the server system 106 as its background color. In FIG. 4A, the secondary color is a darker shade of the primary color. The primary color and secondary color is determined by the server system 106 based on an image associated with "Guardians of the Galaxy" (e.g., image 407 of a poster for "Guardians of the Galaxy").

The card 404 also includes review scores region 412 that includes user or critic review scores 412, showtimes region 414 that includes theater locations and showtimes for "Guardians of the Galaxy" (e.g., locations and showtimes proximate to the client device 102), a region 416 showing the cast of "Guardians of the Galaxy," and an affordance 418 for expanding the card 404 to a structured information page associated with "Guardians of the Galaxy."

Figure 4B:
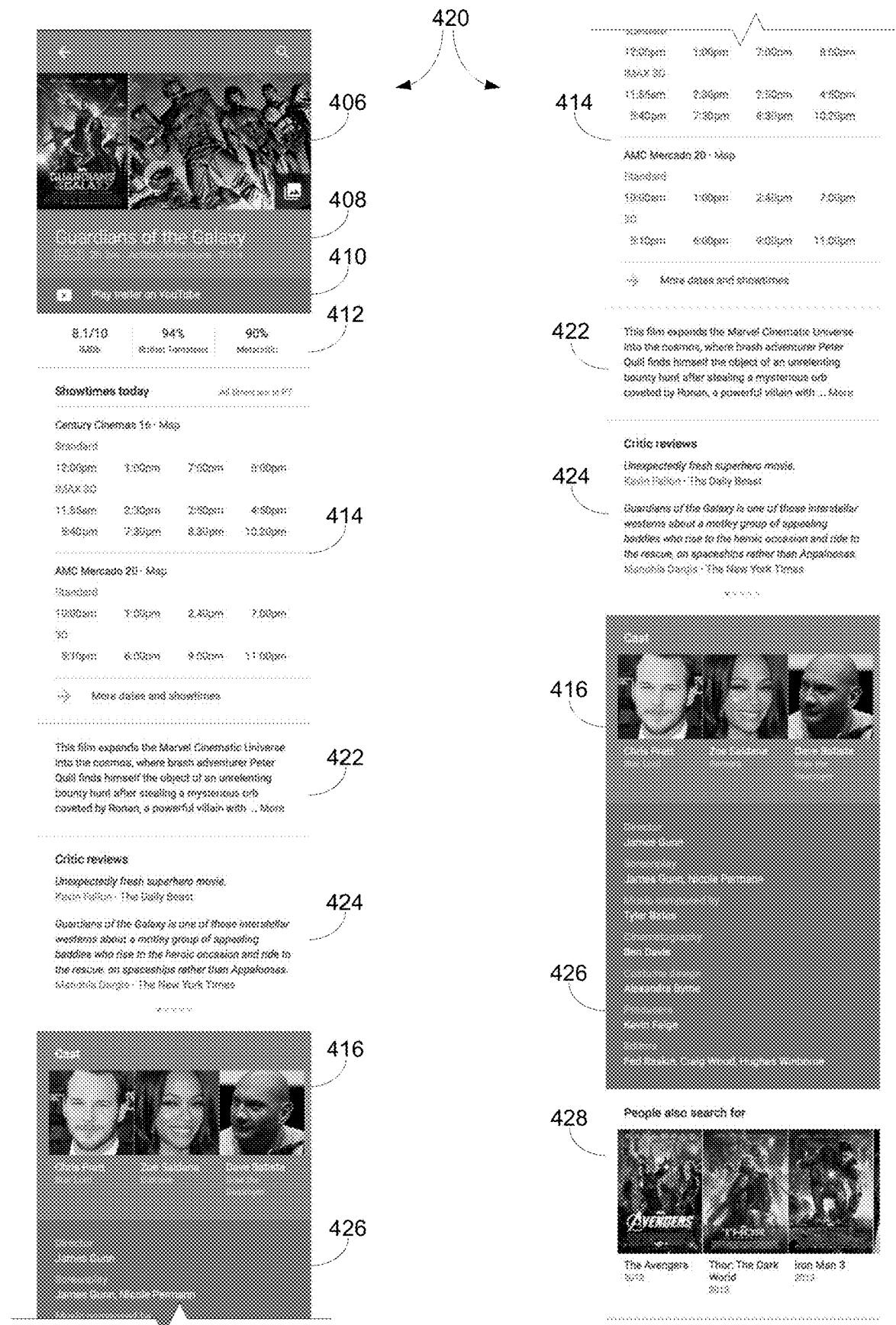
FIG. 4B illustrates an example structured information page in accordance with some implementations.

In response to activation of the affordance 418, the client device 102 displays a structured information page 420 associated with "Guardians of the Galaxy," which is depicted in FIG. 4B. The page 410 includes the same regions as in the card 404, such as regions 406, 408, 410, 412, 414, and 416, and additional regions with information associated with "Guardians of the Galaxy." The page 420 includes a region 422 showing a plot synopsis or summary, a region 424 showing critic review information (e.g., review highlights, review snippets) and a region 426 showing the crew. In some implementations, the page 420 also includes a region 428 showing entities related to "Guardians of the Galaxy" (e.g., entities that users who search for "Guardians of the Galaxy" tend to also search for, based on the query history 240).

As described above, information types included in an information card and a structured information page are either part of a default set or are dynamically selected. For example, the information in the card 404 (title, content rating, running time, genre, release year, trailer, review scores, showtimes, and cast) are part of the default set. In the structured information page, aside from the information common with the card 404, other information that is part of the default set include the crew 426. Dynamically selected information includes, for example, the synopsis (in region 422) and critic review information (in region 424).

In some implementations, an information card is structured to fit entirely on one screen of a client device. In contrast, the length of a structured information page need not be constrained by display size (i.e., the size of the display 108) and, as shown in FIG. 4B, may require scrolling of the display to reveal all information included therein.

As shown in FIG. 4A and FIG. 4B, the title region 408 has a primary color as the background color, and the region 410 has a secondary color as the background color. In the structured information page 420, the cast region 416 has the primary color as the background color, and the crew region 426 has the secondary color as the background color. In some implementations, the server system 106 defines particular regions in the card 404 and/or the page 420 to have the primary color as background color and other regions to have the secondary color as the background color, based on the information displayed in the respective region. For example, the server system 106 defines the background color for the title region 408 to be the primary color (e.g., a shade of purple matching a dominant color in image 407), and the background color for the region 410 with the link to the trailer to be the secondary color (a different shade of the primary color), and these two regions are placed adjacent to each other within the card 404 and page 420. Similarly, for the page 420, the server system 106 defines the background color for the cast region 416 to be the primary color, and the background color for the crew region 426 to be the secondary color, and these two regions are placed adjacent to each other within the page 420. The front end server module formats the information card 404 and the structured information page 420 in accordance with these background color definitions. In some implementations, pairs of regions that have the primary color and secondary color, respectively, and placed adjacent to each other, are predefined (e.g., title and trailer, cast and crew).

Figure 5:
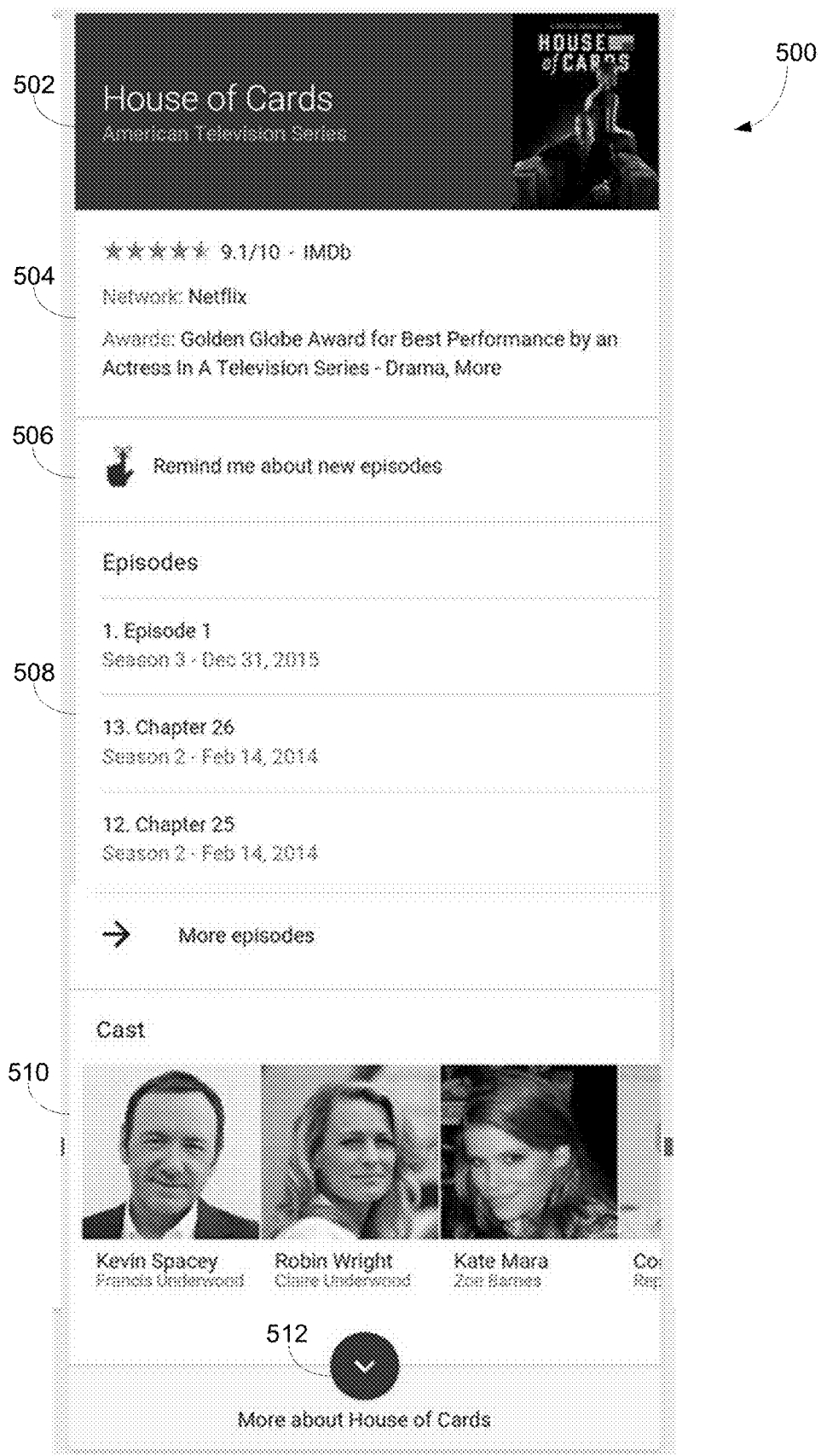
FIG. 5 illustrates an example information card in accordance with some implementations.

FIG. 5 illustrates another example information card associated with an entity in accordance with some implementations. FIG. 5 illustrates an information card 500 associated with the television show "House of Cards." The card 500 includes a title region 502 that includes the show title and one or more images associated with the show, a region 504 that shows review scores, the network in which the show is shown, and awards associated with the show, a region 506 with a link or affordance to activate reminders to the user about new episodes of the show, a region 508 listing episodes of the show, a region 510 with the cast of the show, and an affordance 512 to expand the card 500 into a structured information page associated with the show.

The information types included in the card 404 and the card 505 have differences due to their being associated with different entity classes. For example, the card 404, which is associated with a movie, includes showtimes, but not an episode list or a network or a new episodes reminder link/affordance. The card 500, which is associated with a television show, includes an episode list, a network, and a new episodes reminder link/affordance, but not showtimes.

An information card may include information corresponding to dynamically selected information types. For example, the award information in region 504 is dynamically selected for inclusion in the card 500 based on user activity (e.g., search query history).

Figure 6:
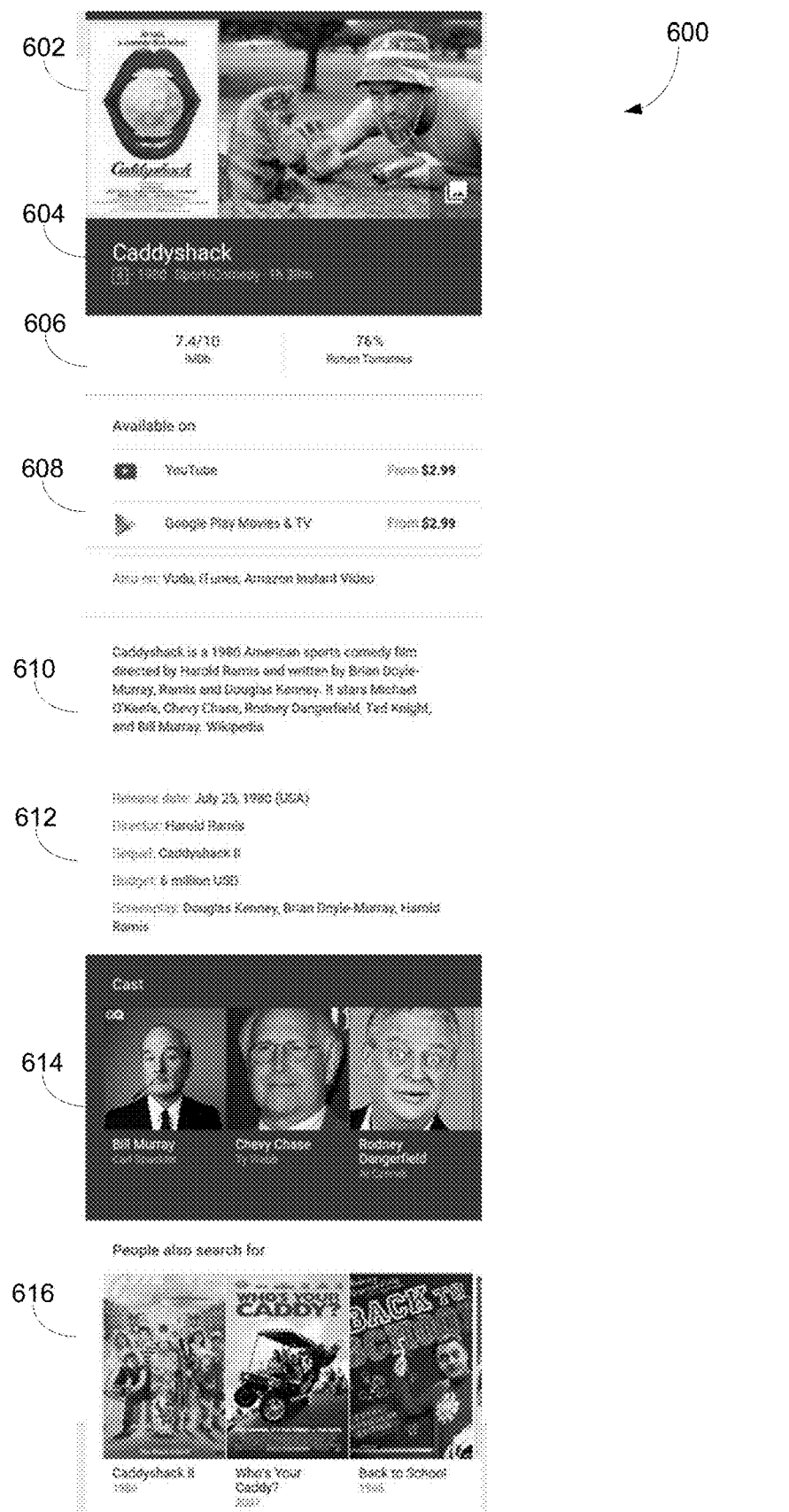
FIG. 6 illustrates an example structured information page in accordance with some implementations.

FIG. 6 illustrates another example structured information page associated with an entity in accordance with some implementations. FIG. 6 illustrates a structured information page 600 associated with the movie "Caddyshack." The structured information page 600 includes an image gallery region 602, a title region 604 that includes the movie title, content rating, release year, genre, and running time, a region 606 that includes user or critic review scores, a region 608 that includes locations for watching or purchasing the movie online, a region 610 with a summary or synopsis of the movie, a region 612 with the release date, director, sequel, budget, and screenplay writers, a region 614 with the cast, and region 616 with related entities. Because the movie "Caddyshack" is a movie that is not currently in theaters, the region for showtimes (e.g., region 414, FIG. 4B) is replaced by a region 608 with information on services or content providers where the user can stream or download the movie as a purchase or rental and/or purchase or rent a copy of the movie (e.g., purchase or rent a DVD or Blu-ray disk of the movie).

As described above, search spikes are considered when analyzing the importance of an information type. Structured information page 600 is an example of a structured information page in which one or more information types are included based on search spikes. For example, searches for Harold Ramis, who passed away in February 2014, may have increased relatively significantly in the aftermath of Ramis' death. Based on this search spike, the server system 106 may determine that, for movies in which Harold Ramis was involved, information types that mention Harold Ramis are selected for inclusion in the structured information page and/or the information card. In the case of the structured information page 600, the director and screenplay writers information types, which both have Harold Ramis, are included in the region 612.

In some implementations, a respective region includes information corresponding to a single information type (e.g., the cast region 416 includes just the cast information). In some other implementations, a respective region includes information corresponding to a single information type (e.g., the cast region 416 includes just the cast information) or multiple information types (e.g., the title region 408 includes the tile, content rating, running time, genre, and release year).

In some implementations, the distinction between regions is apparent (e.g., there are distinct separator lines displayed in the card and/or page to distinguish the regions). In some implementations, the distinction between regions is less apparent (e.g., no distinct separator lines displayed). In some implementations, there are apparent distinctions between some pairs of adjacent regions and less apparent distinction between regions between other pairs of adjacent regions (e.g., separator lines displayed between some adjacent region pairs but not other adjacent region pairs).

In some implementations, a region may be any suitable size, as determined by the server system 106. Thus, a region may be as small as needed to fit one line of text, or may be as large as needed to fit a long list or information corresponding to multiple respective information types. In some implementations, a respective region is scrollable vertically and/or horizontally (e.g., a scrollable image gallery, a scrollable list of cast members).

It should be appreciated that structured information pages 420 and 600 and information card 500 have different primary colors and secondary colors. This is due to their being determined by the server system 106 (e.g., entities color module 250) based on different images (e.g., different posters associated with the respective entities). Of course, it is possible that different entities may have the same associated primary color and secondary color.

Also, in some implementations, the secondary color is not used. For example, the secondary color is not used in information card 500 and structured information page 600.

In accordance with some implementations, a method for displaying a structured entity information page is performed at an electronic device (e.g., a client device 102) having a display, one or more processors, and memory. In some implementations, a computer system or electronic device with a display, one or more processors, and memory includes instructions for performing the method stored in the memory in one or more programs. In some implementations, a non-transitory computer readable storage medium has instructions for performing the method stored in one or more programs in the computer readable storage medium, and the instructions, when executed by a computer system or electronic device with a display, causes the computer system or electronic device to perform the method.

The device receives from a server a structured information page associated with an entity. The client device 102, for example, receives a structured information page (e.g., page 420, page 600) from the server system 106.

The device displays the structured information page. For example, the client device 102 displays the structured information page (e.g., structured information page 420, structured information page 600) on the display 108.

The structured information page includes information structured according to information types associated with the entity. The information types include a first set of predefined information types and a second set of dynamically selected information types. The second set of dynamically selected information types is selected from a set of candidate information types for the entity in accordance with relative importance of the information types in the second set as determined by the server based on historical user activity logged by the server related to one or more of the entity and an entity class associated with the entity. For example, the information in page 420 or 600 is structured by information type; particular regions of the page include information corresponding to respective information types. The information included in a structured information page include information corresponding to one or more information types that are default or "standard" for the entity and/or the entity class and information corresponding to one or more information types that are dynamically selected with respect to the entity and/or the entity class. The dynamically selected information types are selected from a set of candidate information types (e.g., the dynamically selected information types are a subset of the set of candidate information types). The server system 106 dynamically selects information types from the candidate set in accordance with relative importance of the information types as determined by the server system 106 based on historical user activity logged by the server related to one or more of the entity and an entity class associated with the entity (e.g., search query history of users in the aggregate, click logs in the aggregate).

In some implementations, the historical user activity includes search activity by users. For example, the user activity history 120 includes user search activity (e.g., search query history). The information types module 150 analyzes the user search activity in the aggregate to rank information types by how often those information types are searched for and/or are otherwise associated with relatively high user activity volume (e.g., high volume of queries, high volume of clicks).

In some implementations, the historical user activity includes user activity over a predefined time period. The historical user activity may be analyzed over a predefined time period or window (e.g., year to date, last year, last three months, etc.). The time period or window may be set to a specific date or a rolling window.

In some implementations, the historical user activity includes spikes in the user activity. Spikes in user activity, such as search spikes, may be indicative of importance of an information type with respect to a particular entity or related entities (e.g., movies in a recently-passed actor's filmography, popularized song for a movie).

In some implementations, the entity is an instance of the entity class. An entity class is a category of entities (e.g., movies, television shows, books, etc.), and an entity is an instance of the category. In some implementations, the entity class is one of: movie, television show, book, and business. For example, in FIGS. 4A-4B and 6, "Guardians of the Galaxy" and "Caddyshack" are respective instances of the movies entity class. In FIG. 5, "House of Cards" is an instance of the television shows entity class. Additional examples of entity classes include video games, music albums, and organizations.

In some implementations, the predefined set of information types is predefined for the entity class. The default set of information types are defined per entity class. For example, movies have a different default set of information types than television shows, books, etc. The default sets of information types for different entity classes may have information types in common. For example, the default sets for movies and television shows may both have the cast as a default information type.

In some implementations, displaying the structured information page includes displaying the structured information page with a primary color and a secondary color associated with the entity as determined by the server. For example, the structured information page 420 is displayed with the primary color the background color for region 408, and the secondary color as the background color for region 410. The primary color and the secondary color are determined by the server system 106 (e.g., by entity colors module).

In some implementations, the secondary color is associated with the primary color. In some implementations, the secondary color is a different shade (e.g., darker shade) of the primary color. For example, the secondary color in region 410 is a darker shade of the primary color in region 408.

In some implementations, displaying the structured information page with a primary color and a secondary color includes displaying respective regions of the structured information page with respective background colors, wherein the background color of a respective region is the primary color, the secondary color, or a default background color. For example, structured information page 420 is displayed with the primary color as background color in regions 408 and 416, the secondary color as background color in regions 410 and 426, and a default background color (e.g., white) in the other regions.

In some implementations, a respective background color of a first region of the structured information page is the primary color; and a respective background color of a second region, distinct from the first region, of the structured information page is the secondary color. For example, structured information page 420 is displayed with the primary color as background color in regions 408 and 416, and the secondary color as background color in regions 410 and 426.

In some implementations, the first region and the second region are adjacent to each other. For example, in the structured information page 420, regions 408 and 410 are adjacent to each other, and regions 416 and 426 are adjacent to each other.

In some implementations, displaying the structured information page with a primary color and a secondary color associated with the entity as determined by the server comprises associating a first subset of the information types with the primary color and a second subset of the information types with the secondary color. For example, in the structured information page 420, the title and cast are associated with the primary color, and the trailer and the crew are associated with the secondary color.

In some implementations, the primary color is derived from an image (e.g., poster, advertising, image of the business (e.g., exterior, interior, trade dress)) associated with the entity. The primary color and the secondary color, for information card 404 and structured information page 420, are determined based on the image 407 of the poster.

In some implementations, the device, prior to displaying the structured information page, receives from the server an information card, displays the information card, where the information card includes a subset of the information structured according to information types associated with the entity and an affordance to activate display of the structured information page; receives a user input activating the affordance, and in response to activation of the affordance, displays the structured information page (e.g., the primary and secondary colors are used as accent colors on the card). For example, the client device 102 receives an information card (e.g., card 404) as a response to the search query. The client device 102 displays the card, which includes an affordance (e.g., affordance 418) to expand the card. In response to a user input activating the affordance (e.g., a click, a tap gesture), the structured information page (e.g., page 420) is displayed. In some implementations, the primary and secondary colors are also used as background colors and/or accent colors in the information card.

In some implementations, displaying the structured information page includes displaying the information in a plurality of regions within the structured information page, wherein a first subset of the regions correspond to the first set of predefined information types, and a second subset of the regions correspond to a second set of dynamically selected information types. The structured information page, for example, includes multiple regions. Some of these regions include information corresponding to information types in the default set of information types, and other regions include information corresponding to dynamically selected information types.

In accordance with some implementations, a method for formatting for display on a client device a structured information page associated with a specific entity is performed at computer system (e.g., a server system 106) having one or more processors and memory. In some implementations, a computer system with one or more processors and memory includes instructions for performing the method stored in the memory in one or more programs. In some implementations, a non-transitory computer readable storage medium has instructions for performing the method stored in one or more programs in the computer readable storage medium, and the instructions, when executed by a computer system, causes the computer system or electronic device to perform the method.

The system receives a request from the client device for an information page associated with the specific entity. The server system 106, for example, receives a search query or a request for a structured information page (e.g., when the user activates the affordance 418 or 512) for an entity from a client device 102.

The system identifies automatically and without user intervention information associated with the specific entity and respective information types associated with the information. For example, the search engine module 144 identifies the entity and information, of respective information types, associated with the entity.

The system formats automatically and without user intervention the structured information page with a plurality of regions. For example, the front end server module 114 generates a page (e.g., an information card 404, a structured information page 420) associated with the entity, with multiple regions for displaying the information associated with the entity.

The system populates automatically and without user intervention the structured information page with the information associated with the specific entity, including organizing the information such that each of the plurality of regions is populated with information associated with a respective information type. The front end server module 114 populates the page (e.g., the information card 404, the structured information page 420) associated with the entity with the information associated with the entity, with information of respective information types going into respective regions.

The system determines a primary color and a secondary color associated with the specific entity. For example, the entity colors module 250 determines a primary and a secondary color associated with the entity.

The system configures respective regions of the plurality of regions of the structured information page with respective accent colors selected from either the primary color or the secondary color, such that the structure information page includes both the primary color and the secondary color. For example, the front end server module 114 configures one or more particular regions of the page to have the primary color as the background color (e.g., regions 408 and 416 in structured information page 420), and one or more particular regions of the page to have the secondary color as the background color (e.g., regions 410 and 426 in structured information page 420).

The system transmits the resulting structured information page to the client device for display by the client device. The server system 106 transmits the resulting page, with the primary and secondary colors, to the client device 102 for display at the client device 102.

In some implementations, the secondary color is associated with the primary color. In some implementations, the secondary color is a different shade of the primary color (e.g., darker shade). For example, the secondary color in region 410 is a darker shade of the primary color in region 408.

In some implementations, configuring respective regions of the plurality of regions with respective background colors includes associating respective regions of the structured information page with respective background colors, wherein the background color of a respective region is the primary color, the secondary color, or a default background color. For example, the front end server module 114 associates respective regions in the structured information page 420 with the primary color as background color (e.g., in regions 408 and 416), the secondary color as background color (e.g., in regions 410 and 426), or a default background color (e.g., white in the other regions).

In some implementations, a respective background color of a first region of the structured information page is the primary color; and a respective background color of a second region, distinct from the first region, of the structured information page is the secondary color. For example, structured information page 420 has the primary color as background color in regions 408 and 416, and the secondary color as background color in regions 410 and 426.

In some implementations, the first region and the second region are adjacent to each other. For example, in the structured information page 420, regions 408 and 410 are adjacent to each other, and regions 416 and 426 are adjacent to each other.

In some implementations, displaying the structured information page with a primary color and a secondary color associated with the entity as determined by the server includes associating a first subset of the information types with the primary color and a second subset of the information types with the secondary color. For example, in the structured information page 420, the title and cast are associated with the primary color, and the trailer and the crew are associated with the secondary color.

In some implementations, the primary color is derived from an image associated with the entity (e.g., poster, image of the business (e.g., exterior, interior, trade dress)). The primary color and the secondary color, for information card 404 and structured information page 420, are determined based on the image 407 of the poster.

In some implementations, each entity class has an associated list of information types (e.g., stored in candidate information types 252), some of which are predefined for the entity class as a whole as default and some of which are dynamically selected or identified for a particular entity of that class as popular or important. In some implementations, the type information also indicates pairing of primary and secondary types (so the structured information pages and information cards can be generated with appropriately paired information for respective entity classes). For example, for movies, titles and trailers are paired (title is primary, trailer is secondary), and cast and crew are paired (cast is primary, crew is secondary).

In some implementations, some of the information types are associated with a primary action, some with a secondary action, and others with no action. Here, "action" refers to an action performed by the front end module 150 to generate the corresponding web page. For example, a primary action is formatting the region in which the associated information type is included to have the primary color as the background color; and a secondary action is formatting the region in which the associated information type is included to have the secondary color as the background color.

In some implementations, user activity information includes query history (e.g., search query logs) (relative to entity classes and specific entities), and other user activity information that can be logged, including web site activity for entity classes and specific entities, e.g., user web page traversals and clicks on movie, book, TV, car or restaurant review web pages.

As described above, information types are dynamically selected based on user activity history. As the user activity history continues to accumulate and/or change over time, the selected information types may change. Thus, the information cards and pages adapt over time to include information types that users feel are important and/or useful.

In some implementations, movie showtimes/locations and online streaming/watching/purchase services or locations are personalized to the user of the client device 102, based on, for example, the location of the client device 102, which sites or services are accessible from the client device 102, which sites or services the user of the client device 102 has a subscription to, and so on.

Figure 7A:
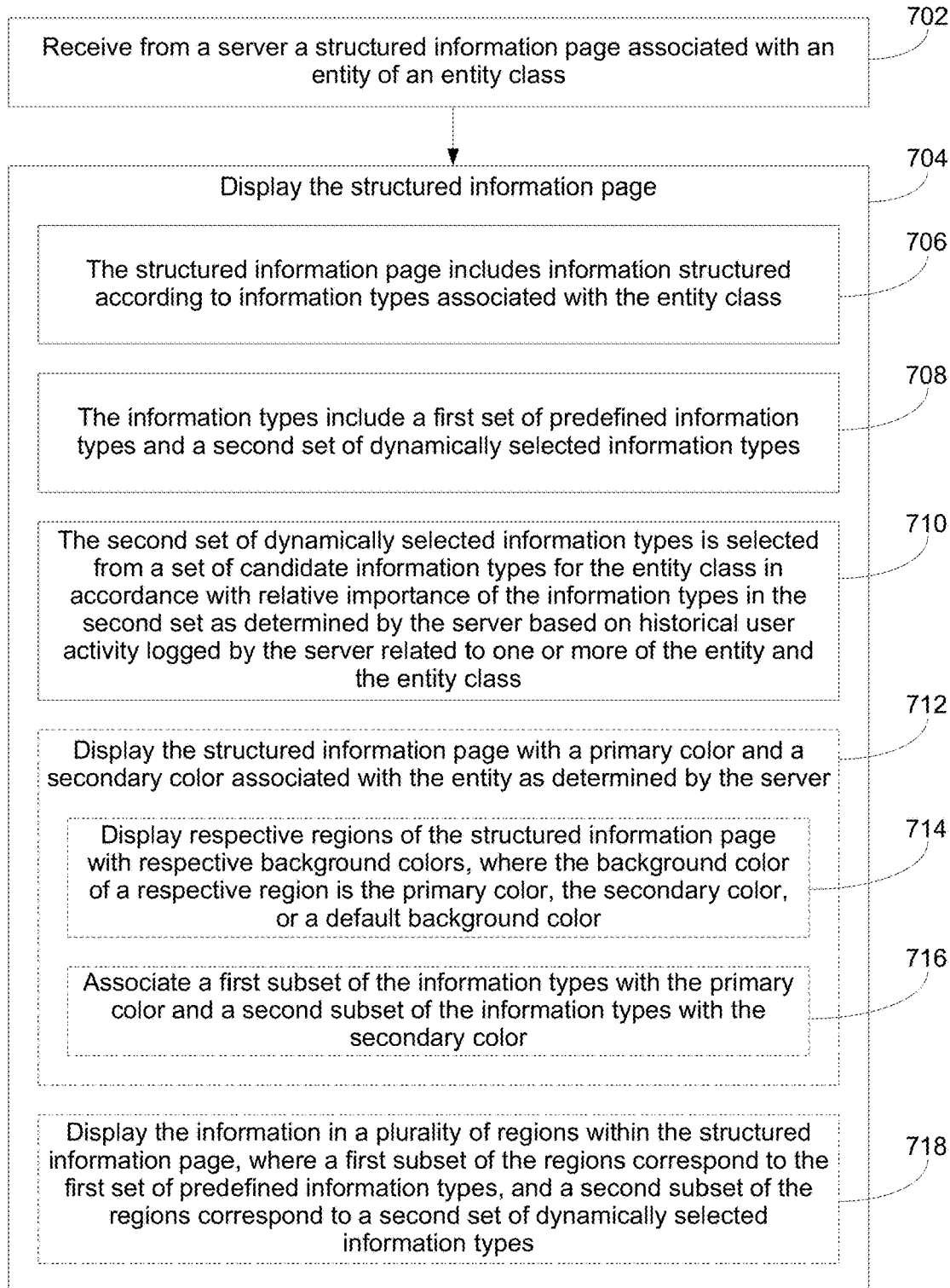
FIGS. 7A-7B are flow diagrams illustrating a method of displaying a structured information page in accordance with some implementations.
Figure 7B:
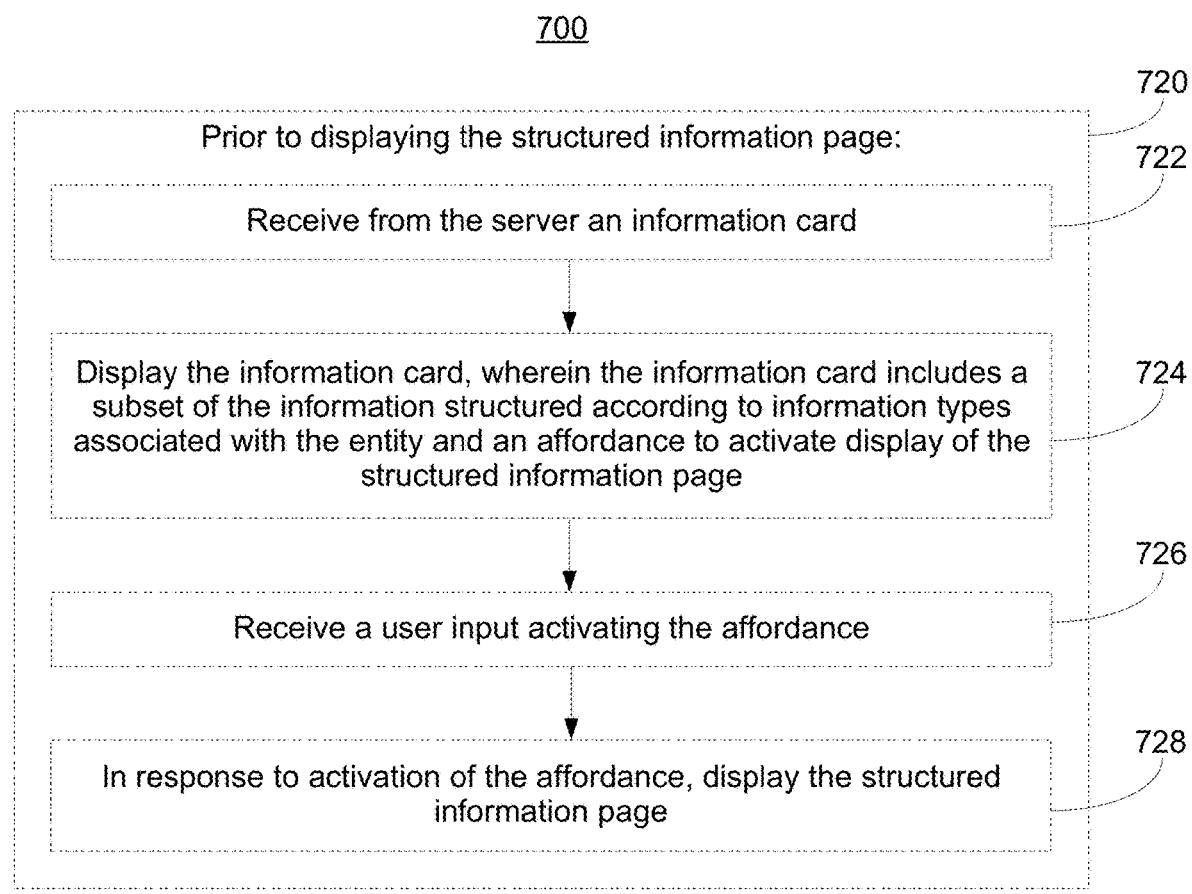

FIGS. 7A-7B illustrate a method 700 of displaying a structured information page in accordance with some implementations. In some implementations, the method 700 is performed at an electronic device (e.g., client device 102) with one or more processors, memory, and a display device. In some implementations, a non-transitory computer readable storage medium stores one or more programs that include instructions which, when executed by an electronic device, causes the electronic device to perform the method 700.

The electronic device receives (702) from a server a structured information page associated with an entity of an entity class. Client device 102, for example, receives a structured information page from server 106. The structured information page may be, for example, an information page (e.g., information page 420 or 600. The structured information page is associated with an entity of an entity class. For example, the structured information page may be associated with a movie or a TV show (the entity class being movies and TV shows, respectively).

The electronic device displays (704) the structured information page. The structured information page includes information structured according to information types associated with the entity class (706), the information types include a first set of predefined information types and a second set of dynamically selected information types (708), and the second set of dynamically selected information types is selected from a set of candidate information types for the entity class in accordance with relative importance of the information types in the second set as determined by the server based on historical user activity logged by the server related to one or more of the entity and the entity class (710). The client device 102, for example, displays the information page 420 or 600. The structured information page includes information organized according to the types of the information. For example, if the structured information page is for a movie, the information includes information types such as show times, cast, crew, meta-review scores, quotes from reviews, and so on, and the structured information page is structured to organize the information according to the types (e.g., show times in one section, the cast in another section, and so forth). The information types include some that are predefined and others that are dynamically selected. The dynamically selected information types are selected by the server 106 (e.g., the information types module 150) from a set of candidate information types 252 associated with the entity class based on relative importance of the candidate information types for the entity class, where the relative importance is determined by the server 106 (e.g., the information types module 150) based on past user activity 120 logged by the server 106 with respect to the entity and/or the entity class.

In some implementations, the historical user activity includes search activity by users. The past user activity 120 may include, for example, search queries by users for the entity and/or the entity class.

In some implementations, the historical user activity includes user activity over a predefined time period. The past user activity 120 may include user activity over a particular time period. For example, the server 106 may consider past search queries by users over the past week, over the past month, or the like.

In some implementations, the historical user activity includes spikes in the user activity. For example, search queries for an entity may suddenly increase, indicating a heightened demand for, or popularity of, particular information (e.g., information on the entity).

In some implementations, the entity is an instance of the entity class. For example, a movie entity is an instance of the movies entity class.

In some implementations, the entity class is one of: movie, television show, book, and business. For example, the structured information page may be displayed for a movie, a TV show, a book, or a business (e.g., a restaurant, a bar, a service business, etc.).

In some implementations, the predefined set of information types is predefined for the entity class. The predefined information types are predefined for the entity class. Different entity classes may have different sets of predefined information types. For example, the set of predefined information types for a movie may include show times, cast, crew, and release date. The set of predefined information types for a TV show may include episodes, cast, and crew. The set of predefined information types for a business may include address, business hours, and contact information.

In some implementations, displaying the structured information page includes displaying (712) the structured information page with a primary color and a secondary color associated with the entity as determined by the server. The structured information page is displayed with multiple colors, including a primary color and a secondary color. The primary color and secondary color are colors, determined by the server 106 (e.g., the entity colors module 250), as associated with the entity. In some implementations, the server 106 determines the primary and secondary colors for an entity based on content associated with the entity (e.g., images, online documents, etc.).

In some implementations, the secondary color is associated with the primary color. In some implementations, the secondary color is a different shade of the primary color. For example, the secondary color may be a lighter or darker shade of the primary color.

In some implementations, displaying the structured information page with a primary color and a secondary color includes displaying (714) respective regions of the structured information page with respective background colors, where the background color of a respective region is the primary color, the secondary color, or a default background color. The structured information page 420 or 600 includes one or more regions, sections, or areas, where each region/area/section has a respective background color. The background color for a respective region may be the primary color, the secondary color, or a default background color.

In some implementations, a respective background color of a first region of the structured information page is the primary color, and a respective background color of a second region, distinct from the first region, of the structured information page is the secondary color. In some implementations, the first region and the second region are adjacent to each other.

In some implementations, displaying the structured information page with a primary color and a secondary color associated with the entity as determined by the server includes associating (716) a first subset of the information types with the primary color and a second subset of the information types with the secondary color. The predefined information types are associated with the primary color and may be displayed in regions that have the primary color as the background color. The dynamically selected information types are associated with the secondary color and may be displayed in regions that have the secondary color as the background color. In some implementations, any information type may be displayed in a region that has a default background color, even if that information type is associated with the primary color or the secondary color.

In some implementations, the primary color is derived from an image associated with the entity. The server 106 may determine the primary color from images associated with the entity. For example, for a movie, the server 106 may analyze images (e.g., movie poster art) associated with the movie and identify a particular color from the images as the primary color.

In some implementations, displaying the structured information page includes displaying (718) the information in a plurality of regions within the structured information page, where a first subset of the regions corresponds to the first set of predefined information types, and a second subset of the regions corresponds to a second set of dynamically selected information types. The information page 420 or 600 includes multiple regions (e.g., regions 406, 408, 410, 412, etc. in structured information page 420; regions 602, 604, 606, 608, etc. in structured information page 600). Some of the regions in the structured information page are assigned to displaying information for the predefined information types, and some other regions in the structured information page are assigned to displaying information for the dynamically selected information types.

In some implementations, the electronic device, prior to displaying the structured information page (720), receives (722) from the server an information card; displays (724) the information card, where the information card includes a subset of the information structured according to information types associated with the entity and an affordance to activate display of the structured information page; receives (726) a user input activating the affordance; and in response to activation of the affordance, displays (728) the structured information page. The electronic device may display an information card (e.g., information card 404 or 500) before displaying the structured information page. The information card includes a subset of the information that would be displayed in the structured information page, and serves as a preview of the information about the entity for which the user is seeking information. The information card also includes an affordance (e.g., affordance 418 or 512) to activate display of the structured information page. The user may activate the affordance with a user input (e.g., a tap gesture on the affordance). In response to the activation of the affordance, the structured information page is displayed (e.g., the information card is expanded to the structured information page), as in step 704. In some implementations, the steps 720-728 may be performed prior to steps 702 and 704, between steps 702 and 704, or interspersed with steps 702 and 704.

Figure 8A:
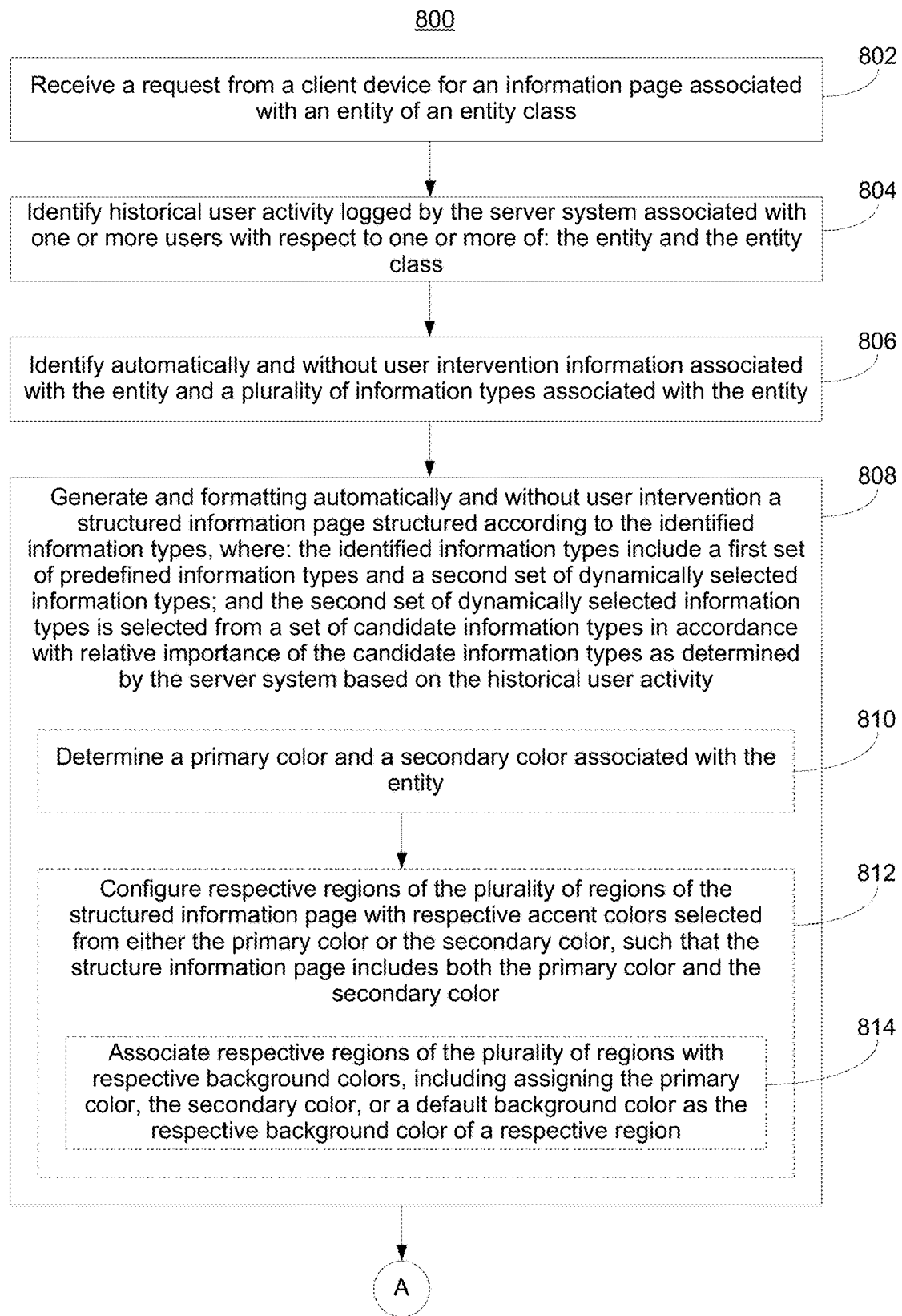
FIGS. 8A-8B are flow diagrams illustrating a method of generating and providing a structured information page in accordance with some implementations.
Figure 8B:
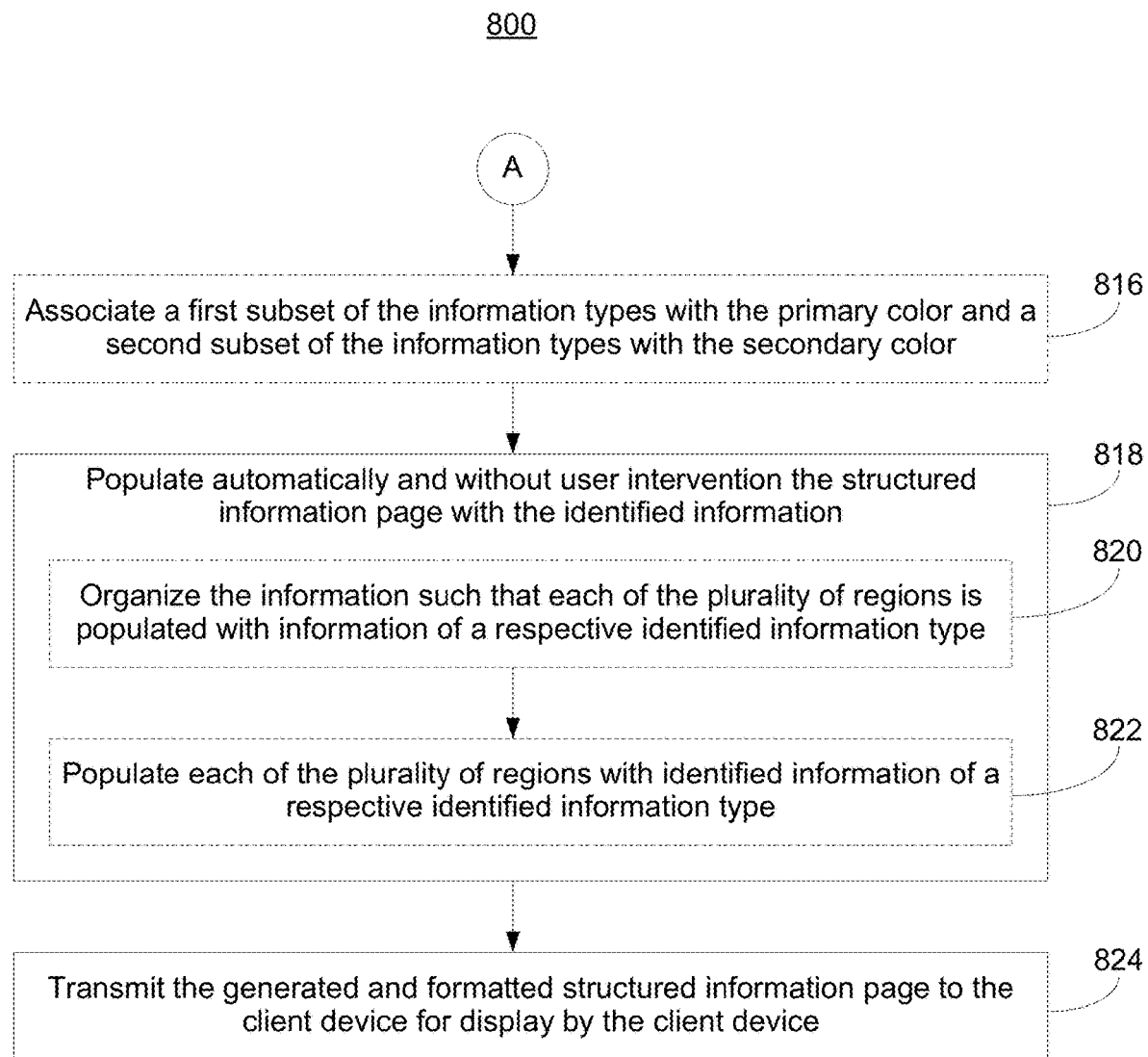

FIGS. 8A-8B illustrate a method 800 of generating and providing a structured information page in accordance with some implementations. In some implementations, the method 800 is performed at server system (e.g., server 106) with one or more processors and memory. In some implementations, a non-transitory computer readable storage medium stores one or more programs that include instructions which, when executed by a server system, causes the server system to perform the method 800.

The server system receives (802) a request from a client device for an information page associated with an entity of an entity class. The server 106 receives a request from a client device 102 for an information page associated with an entity (e.g., a movie, a TV show, etc.). In some implementations, the request is a search query for the entity or an activation of an affordance in an information card for the entity (e.g., affordance 418 in information card 404).

The server system identifies (804) historical user activity logged by the server system associated with one or more users with respect to one or more of the entity and the entity class. The server 106 identifies past user activity from multiple users (e.g., logged in user activity history 120) with respect to the entity and/or the entity class.

In some implementations, the historical user activity includes search activity by users. The past user activity 120 may include, for example, search queries by users for the entity and/or the entity class.

In some implementations, the historical user activity includes user activity over a predefined time period. The past user activity 120 may include user activity over a particular time period. For example, the server 106 may consider past search queries by users over the past week, over the past month, or the like.

In some implementations, the historical user activity includes spikes in the user activity. For example, search queries for an entity may suddenly increase, indicating a heightened demand for, or popularity of, particular information (e.g., information on the entity).

In some implementations, the entity is an instance of the entity class. For example, a movie entity is an instance of the movies entity class.

In some implementations, the entity class is one of: movie, television show, book, and business. For example, the structured information page may be displayed for a movie, a TV show, a book, or a business (e.g., a restaurant, a bar, a service business, etc.).

The server system identifies (806) automatically and without user intervention information associated with the entity and a plurality of information types associated with the entity. The server 106 automatically identifies entity information and information types in, for example, entities information database 122.

The server system generates and formats (808) automatically and without user intervention a structured information page structured according to the identified information types, where the identified information types include a first set of predefined information types and a second set of dynamically selected information types, and the second set of dynamically selected information types is selected from a set of candidate information types in accordance with relative importance of the candidate information types as determined by the server system based on the historical user activity. The server 106 automatically and without need for additional user input, generates and formats a structured information page associated with the entity according to the identified information types for the entity, which includes predefined information types and dynamically selected information types. The server 106 (e.g., the information types module 150) selects the dynamically selected information types from a set of candidate information types 252 associated with the entity class based on relative importance of the candidate information types for the entity class, where the relative importance is determined by the server 106 (e.g., the information types module 150) based on past user activity 120 logged by the server 106 with respect to the entity and/or the entity class.

In some implementations, the predefined set of information types is predefined for the entity class. The predefined information types are predefined for the entity class. Different entity classes may have different sets of predefined information types. For example, the set of predefined information types for a movie may include show times, cast, crew, and release date. The set of predefined information types for a TV show may include episodes, cast, and crew. The set of predefined information types for a business may include address, business hours, and contact information.

The server system populates (818) automatically and without user intervention the structured information page with the identified information. The server 106 automatically inserts the identified information for the entity into the structured information page.

The server system transmits (824) the generated and formatted structured information page to the client device for display by the client device. The server 106 transmits the structured information page to the client device 102 for display by the client device 102 (e.g., in the assistant application 126-2).

In some implementations, the structured information page includes a plurality of regions. The structured information page may include multiple delineated regions, sections, or areas where information for the entity may be displayed.

In some implementations, populating automatically and without user intervention the structured information page with the information associated with the entity includes organizing (820) the information such that each of the plurality of regions is populated with information of a respective identified information type, and populating (822) each of the plurality of regions with identified information of a respective identified information type. The server 106 inserts information of respective information types into respective regions of the structured information page. For example, structured information page 420 includes regions 406, 408, 410, and so on. A region in the structured information page may be populated with information, for the entity, of a respective information type.

In some implementations, a first subset of the plurality of regions corresponds to the first set of predefined information types, and a second subset of the plurality of regions corresponds to a second set of dynamically selected information types. Some of the regions in the structured information page are assigned to displaying information for the predefined information types, and some other regions in the structured information page are assigned to displaying information for the dynamically selected information types.

In some implementations, generating and formatting the structured information page further includes determining (810) a primary color and a secondary color associated with the entity, and configuring (812) respective regions of the plurality of regions of the structured information page with respective accent colors selected from either the primary color or the secondary color, such that the structure information page includes both the primary color and the secondary color. The server 106 (e.g., the entity colors module 250) determines a primary color and a secondary color associated with the entity. In some implementations, the server 106 determines the primary and secondary colors for the entity based on content associated with the entity (e.g., images, online documents, etc.). The server 106 assigns a respective region of the structured information page with the primary color, the secondary color, or a default color as an accent color, such that at least the primary color and optionally also the secondary color are included and displayed in the structured information page.

In some implementations, the primary color is derived from an image associated with the entity. For example, the entity colors module may determine the primary color for a movie entity from colors in movie poster images associated with the movie entity.

In some implementations, the secondary color is associated with the primary color. In some implementations, the secondary color is a different shade of the primary color. For example, the secondary color may be a lighter or darker shade of the primary color.

In some implementations, configuring respective regions of the plurality of regions with respective accent colors includes associating (814) respective regions of the plurality of regions with respective background colors, including assigning the primary color, the secondary color, or a default background color as the respective background color of a respective region. The server 106 associates or assigns respective regions with respective background colors. A respective region may be assigned the primary color, the secondary color, or a default background color as the background color for the region.

In some implementations, a respective background color of a first region of the structured information page is the primary color, and a respective background color of a second region, distinct from the first region, of the structured information page is the secondary color. In some implementations, the first region and the second region are adjacent to each other.

In some implementations, the server system associates (816) a first subset of the information types with the primary color and a second subset of the information types with the secondary color. The server 106 associates some of the information types with the primary color and some other information types with the secondary color. The information types associated with the primary color are populated into regions with the primary color as the accent color (e.g., background color), and the information types associated with the secondary color are populated into regions with the secondary color as the accent color.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at a server system comprising memory and one or more processors, the method comprising:
    receiving from a client device a search query that includes a first entity; and
    in response to the search query:
        determining personalization information relevant to the search query and/or the first entity;
        identifying, automatically and without user intervention, information associated with the first entity and a plurality of information types associated with the first entity, the plurality of information types including:
            a first set of predefined information types that is predefined based for a category of the first entity, and
            a second set of dynamic information types that reflects the personalization information, wherein the second set of dynamic information types is distinct from the first set of predefined information types;
        generating and formatting, automatically and without user intervention, an information card for the first entity, the information card having a plurality of regions and being structured according to the identified information types;
        populating, automatically and without user intervention, the information card with the information associated with the first entity, including organizing the information such that each of the plurality of regions is populated with information associated with a respective information type; and
        after the populating, transmitting the information card to the client device for display on the client device.

2. The method of claim 1, wherein:
    the first entity is a media entity; and
    the personalization information includes subscriptions that a user of the client device has access to.

3. The method of claim 1, wherein:
    the first entity is a media entity; and
    the personalization information is based on a location of the client device.

4. The method of claim 1, wherein generating and formatting, automatically and without user intervention, the information card for the first entity includes generating an affordance that, when selected by a user of the client device, causes the information card for the first entity to expand on the client device.

5. The method of claim 1, wherein the second set of dynamic information types is selected from a set of candidate information types in accordance with relative importance of the candidate information types as determined by the server system based on historical user activity.

6. The method of claim 5, wherein:
    the historical user activity is logged by the server system; and
    the historical user activity is associated with one or more users with respect to one or more of: the first entity or the category of the first entity.

7. The method of claim 5, wherein the historical user activity includes search activity of a plurality of users.

8. The method of claim 7, wherein the search activity of the plurality of users is over a predefined time window or over a rolling time window.

9. The method of claim 1, wherein the category of the first entity is one of: movie, television show, book, or business.

10. A server system, comprising:
    one or more processors;
    memory; and
    one or more programs, wherein the one or more programs are stored in the memory and are configured to be executed by the one or more processors, the one or more programs including instructions for:
        receiving from a client device a search query that includes a first entity, and
        in response to the search query:
            determining personalization information relevant to the search query and/or the first entity;
            identifying, automatically and without user intervention, information associated with the first entity and a plurality of information types associated with the first entity, the plurality of information types including:
                a first set of predefined information types that is predefined based for a category of the first entity, and
                a second set of dynamic information types that reflects the personalization information, wherein the second set of dynamic information types is distinct from the first set of predefined information types;

generating and formatting, automatically and without user intervention, an information card for the first entity, the information card having a plurality of regions and being structured according to the identified information types;

populating, automatically and without user intervention, the information card with the information associated with the first entity, including organizing the information such that each of the plurality of regions is populated with information associated with a respective information type; and after the populating, transmitting the information card to the client device for display on the client device.

11. The server system of claim 10, wherein the instructions for generating and formatting, automatically and without user intervention, the information card for the first entity includes instructions for generating an affordance that, when selected by a user of the client device, causes the information card for the first entity to expand on the client device.

12. The server system of claim 10, wherein the second set of dynamic information types is selected from a set of candidate information types in accordance with relative importance of the candidate information types as determined by the server system based on historical user activity.

13. The server system of claim 12, wherein:
the historical user activity is logged by the server system; and
the historical user activity is associated with one or more users with respect to one or more of: the first entity or the category of the first entity.

14. The server system of claim 12, wherein the historical user activity includes search activity of a plurality of users.

15. The server system of claim 14, wherein the search activity of the plurality of users is over a predefined time window or over a rolling time window.

16. A non-transitory computer readable storage medium storing one or more programs, the one or more programs comprising instructions that, when executed by a server system, cause the server system to perform operations comprising:

receiving from a client device a search query that includes a first entity; and in response to the search query:

determining personalization information relevant to the search query and/or the first entity;

identifying, automatically and without user intervention, information associated with the first entity and a plurality of information types associated with the first entity, the plurality of information types including:

a first set of predefined information types that is predefined based for a category of the first entity, and a second set of dynamic information types that reflects the personalization information, wherein the second set of dynamic information types is distinct from the first set of predefined information types;

generating and formatting, automatically and without user intervention, an information card for the first entity, the information card having a plurality of regions and being structured according to the identified information types;

populating, automatically and without user intervention, the information card with the information associated with the first entity, including organizing the information such that each of the plurality of regions is populated with information associated with a respective information type; and after the populating, transmitting the information card to the client device for display on the client device.

17. The non-transitory computer readable storage medium of claim 16, wherein the first entity is a media entity, and the personalization information includes subscriptions that a user of the client device has access to.

18. The non-transitory computer readable storage medium of claim 16, wherein the first entity is a media entity, and the personalization information is based on a location of the client device.

19. The non-transitory computer readable storage medium of claim 16, wherein the category of the first entity is one of: movie, television show, book, and business.

20. The non-transitory computer readable storage medium of claim 16, wherein the second set of dynamic information types is selected from a set of candidate information types in accordance with relative importance of the candidate information types as determined by the server system based on historical user activity.

* * * * *